United States Patent [19]

Bourgeois et al.

[11] Patent Number: 5,060,170

[45] Date of Patent: Oct. 22, 1991

[54] SPACE ALLOCATION AND POSITIONING METHOD FOR SCREEN DISPLAY REGIONS IN A VARIABLE WINDOWING SYSTEM

[75] Inventors: Nancy E. Bourgeois, Cary; Sandra L. Hause, Raleigh; Arwin B. Lindquist, Cary, all of N.C.

[73] Assignee: International Business Machines Corp., Armonk, N.Y.

[21] Appl. No.: 391,290

[22] Filed: Aug. 9, 1989

[51] Int. Cl.[5] .......... G06F 3/14

[52] U.S. Cl. .......... 364/521; 364/518; 340/721

[58] Field of Search .......... 364/518, 521; 340/721, 340/734, 731, 750, 798, 799

[56] References Cited

U.S. PATENT DOCUMENTS

| | | | |
|---|---|---|---|
| 4,598,384 | 7/1986 | Shaw et al. | 364/521 X |
| 4,651,146 | 3/1987 | Lucash et al. | 340/750 X |
| 4,653,020 | 3/1987 | Cheselka et al. | 340/747 X |
| 4,663,617 | 5/1987 | Stockwell | 340/726 |
| 4,698,779 | 10/1987 | Holden et al. | 364/520 |
| 4,731,606 | 3/1988 | Bantz et al. | 340/721 X |
| 4,783,648 | 11/1988 | Homma et al. | 340/721 X |
| 4,789,962 | 12/1988 | Berry et al. | 364/521 X |
| 4,794,386 | 12/1988 | Bedrij et al. | 364/521 X |
| 4,823,108 | 4/1989 | Pope | 364/521 X |
| 4,823,303 | 4/1989 | Terasawa | 364/521 |
| 4,961,070 | 10/1990 | Maher et al. | 364/521 X |
| 5,001,697 | 3/1991 | Torres | 340/721 X |

*Primary Examiner*—David L. Clark
*Attorney, Agent, or Firm*—Edward H. Duffield

[57] ABSTRACT

In display screen or system technology, a window is a viewing area on the video display. It may be the full screen region or a smaller region represented within a border of typically rectangular shape into which data from application programs and the like may be written for display. One or more windows may appear on the face of a video display screen. In the context of the present invention, the window areas are of variable size selected by the operator and resizing of the regions or areas within each variable window must be modified to suit the newly selected window size. Attributes associated with the regions to be placed within a given window include those for relative priority of display within the window, location within the window and the minimum dimensions of each region to be included within the window. Program controlled operations examine the minimum specifications for the regions to be displayed within a window in comparison with the operator-selected window size in which the regions are to be displayed, and aportion the available window space among the regions to be displayed in accordance with their relative priority and location in the window and their specified minimum sizes, and generate the control parameters necessary for recreating the window display with the appropriate regional spaces allocated and located within the window.

8 Claims, 8 Drawing Sheets

SPACE ALLOCATION AND POSITIONING METHOD FOR SCREEN DISPLAY REGIONS IN A VARIABLE WINDOWING SYSTEM

FIELD OF THE INVENTION

This invention relates generally to computer systems having displays utilizing one or more data windows for manifesting or confining data within specified areas on the display screen. In particular, the invention relates to variable size windowing controls in which a collection of one or more regions for containing data are bounded by an operator window boundary of variable size.

PRIOR ART

A wide variety of prior patents exist in the general field of this invention. The apparatus and systems for controlling the display of data within fixed size windows on the face of a display screen or for controlling the formatting of data within regions or zones on the face of such a screen are fairly well known. For example, U.S. Pat. Nos. 4,598,384, 4,651,146, 4,653,020, 4,663,617, 4,698,779 and 4,731,606, all commonly assigned to the assignee of this application, may be cited. These patents show various details of systems, methods, and controls for the display of one or more data windows on the face of a display screen. For their teaching of apparatus and method for creating and displaying windows of data on a display screen, these patents are incorporated herein by reference. However, none of these references provides any means of automatically varying the size and shape of included regions within a window as the operator selects different sizes for the display window itself.

Other patents showing similar sorts of multiple window display apparatus and techniques which also fail to teach a method of varying automatically the sizes, shapes and locations of regions to be displayed within a window as the window size varies are U.S. Pat. Nos. 4,783,648 and 4,823,108.

In the foregoing patents, in order to change the size of a window, either the operator must specify the newly desired sizes, shapes and locations for each region or area within a window which is to be displayed in order to change the size of a window, or the windows are of fixed size only. Alternatively, if the size or location of the overall window frame is changed, the regions within the window are not varied but are exposed or occluded to a greater or lesser extent as the size of the window varies. None of the patents appears to offer a solution which varies the size of the regions or areas to be displayed within the window as the size of the window varies.

OBJECTS OF THE INVENTION

In view of the foregoing known difficulties with the prior art, it is an object of this invention to provide an improved display system for computer data in which one or more display windows may be of variable size and the regions or areas within the window are automatically expanded or reduced as the size of the window is accordingly increased or decreased.

It is the further object of this invention to provide an improved method of allocating display space within a window to the various regions or areas which are specified as required to be displayed within the window.

Yet another object of this invention is to provide an improved method of specifying regions for display within a window that facilitates automatic recalculation of the sizes and locations of regions as the size of display window is varied.

BRIEF SUMMARY OF THE INVENTION

In the preferred embodiment of this invention, unique algorithmic processes have been devised to utilize specified display region control indicators, together with specifications of the newly desired window size, in order to calculate new final dimensions and relative locations for the regions to be displayed within the window. Regional control parameters specifying the minimum dimensions in two mutually orthogonal directions are specified by the application whose data is to be displayed within a given region. Furthermore, an indicator for relative location within the window for the region and a priority value are both utilized (for establishing which regions may first receive extra available space, or, on the contrary, which regions may be truncated if the window size grows too small to accomodate all of the intended regions). An analytical process of first assessing whether the combined minimum sizes of the various regions to be displayed within a window exceed the total window dimensions is performed. If sufficient area exists within the window to allow at least the minimum specified areas for the regions to be contained within the window to be displayed, then the available space within the window is allocated according to a prescribed process of assigning a space available first in the primary direction of organization of the region (or grouping of regions) to be displayed within the window and then in the direction orthogonal thereto, with the spaced assigned to each member region within the window on the basis of its priority and minimum size specifications in general. Special processes for assigning the available space to primitive display regions, i.e. ordinary rectangles, or to subsets of display regions, i.e. groups of two or more rectangles, to occupy the space within a defined window frame are developed and explained.

The foregoing objects of the invention and still others not specifically enumerated are met in a preferred embodiment thereof as will be described in greater detail with reference to the drawings in which:

DESCRIPTION OF PREFERRED EMBODIMENT OF INVENTION

Figure 1:
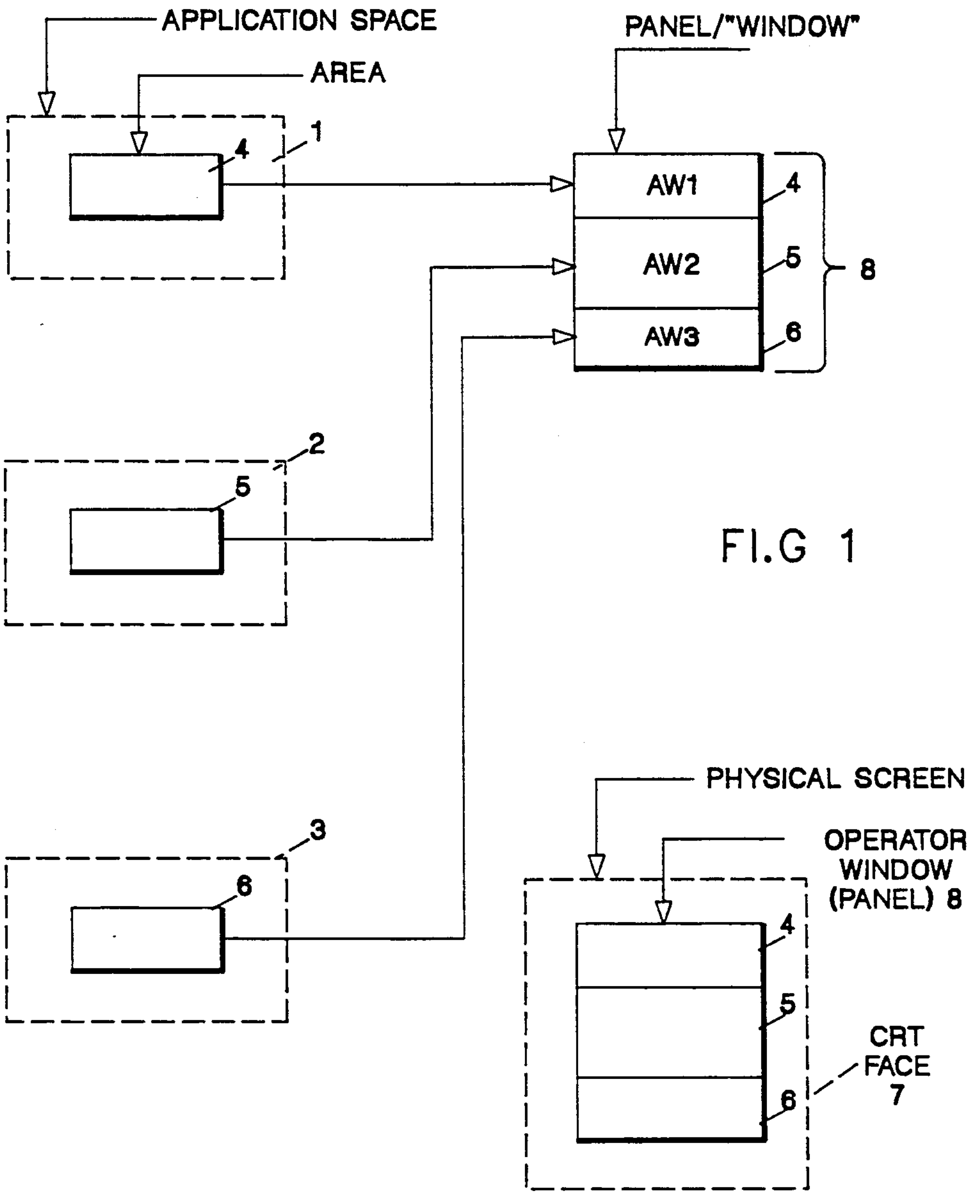
FIG. 1 illustrates the general concepts of display windows, areas and subsets of areas to be displayed within the windows.

As alluded to earlier, the phrase "variable windowing" in this invention is used to refer to a representational model in which a collection of one or more regions in which information is to be displayed is bounded by an operator window frame of variable size. The size or shape of the operator window frame is changed by a computer or terminal operator who desires to relocate a window on the face of a display screen or to change its size or shape. If the size or shape of the window frame is changed, the contents of the window in the normal prior art systems will be truncated if the window frame is reduced or will be enlarged if the frame size is increased. The effect of this in prior art systems is to display more or less of the data within each region or area within the window. This is undesirable, since as the window is shrunk, so much information may be truncated that the regions or areas within the window become essentially meaningless. Similarly, if the size of the window frame is increased, but the amount of data to be displayed is relatively small or limited, increasing the frame size causes a lot of "white space" displayed around the information within each region which tends to make finding the information within each region somewhat awkward and inconvenient.

It would be most desirable if the information display regions making up a window were expanded or contracted somewhat proportionally to the expansion or contraction of the window itself, keeping at least a minimum required amount of display space available and adjusting the maximum to a degree that is suitable for the amount of information to be displayed. Such a complex process of assigning and reassigning of available space to the one or more display regions within a window may be easily accomplished by a programmer or operator changing the parameters that define each area, but this is a cumbersome process, especially when multiple regions or areas are exhibited within each window.

The present invention solves this problem by providing automatic processing methods which are driven by the operator's selection of a new window frame size. These processing methods operate utilizing specified minimum parameters, location indicators and area priorities and the analysis of the direction of primary orientation of any subsets of areas within the display. The processing methods recalculate resulting region sizes to fully utilize all of the space in the redefined window frame size. This approach also solves another problem: that of specifying from one program, which contains the parameters for constructing a given window display with its inherent regions, all that is necessary to reconstruct a similar display in another program or system which may have a differently-specified total window frame size or display area availability.

Succinctly stated, the challenge of this invention is in finding a suitable method of implementation by which a programming interface can handle the generalized information about a specific layout of a screen display and also manage a complex set of rules necessary for adapting the display to new window sizes as the size of the window changes. For example, if program A were a program that created and recreated displays based on the size of the operator window that is specified, and if program B were a specific application of program A, how would program B indicate to program A the desired structure for building the overall screen display that program B wants?

Figure 2:
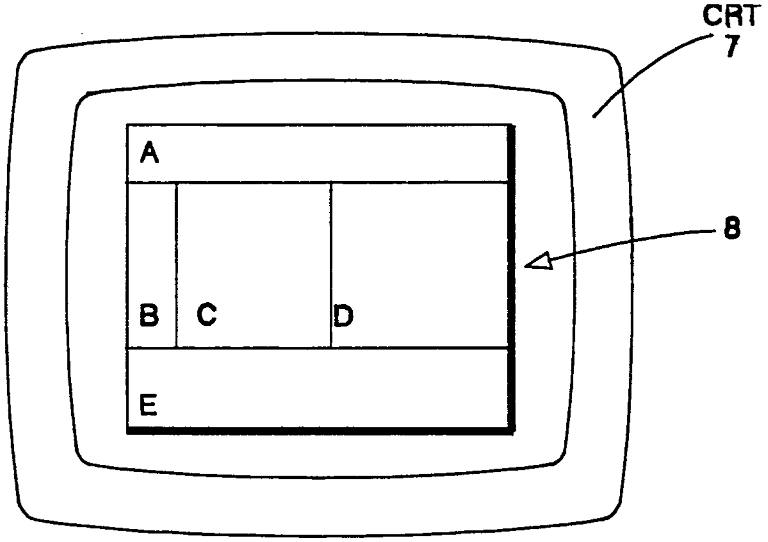
FIG. 2 shows a typical CRT screen with a single window having five sub areas or regions within it forming a subset of regions for display.

FIG. 2 illustrates this problem somewhat graphically. In FIG. 2, a CRT screen face is depicted having a single window 8 comprising a collection of regions A through E that are presumed to have been specified by the application program or programmer. What must the application program or programmer communicate to the display program in order to reconstruct this display? First, the information that region A is always on the top, region E is always on the bottom, and regions B, C and D are in between the regions A and E. Furthermore, region B is located to the left of region C and C to the left of region D. When the window is made larger in the vertical direction, regions B, C and D should expand. However, region A should never be more than one line deep, and region E should never be more than two lines deep in this arbitrary example. If the window is made smaller in the vertical direction, the system should make sure that region A is always visible, i.e. has the highest priority, should make certain that regions B, C and D are always at least three lines deep and that region E has the lowest priority and may be truncated first followed by truncation of any additional space beyond the minimum three lines in regions B, C and D. When the width of the operator window changes, the system should make sure that region B never gets wider than a single column width and that regions C and D should expand or contract equally as the operator width changes.

This is not an exhaustive list of all of the specifications that would be necessary to communicate to a display program from an application the rules to be followed in changing the allocation of space as the window is increased or decreased, but it illustrates the problem very graphically. In fact, none of the prior art approaches address this problem at all, presumably because of the complexity of solving it.

The present invention provides a means for managing the area for display within a window with a program that operates utilizing standard screen display definition languages. Such languages are those based on international standard (ISO) markup languages that allow programs or programmers to communicate with programs. These are defined in a general fashion and specific examples will be given later herein. The definitions of screen displays utilize tag language which are sets of predefined commands for specifying minimum size, primary direction of orientation of the region or subset, the subset's relative location in the window and the subset's priority by means of various indicators. Indicators for the start of the area definition, the relative size, location and priority of the areas within the window may all be specified.

Returning to FIG. 1, a variety of application programs are illustrated as the schematic boxes 1, 2 and 3. Each of these programs may be presumed to have some function that results in data being created that would fill a given area identified as areas 4, 5 and 6. It is further presumed that the system operator wishes to display a screen or window having a subset 8 made up of an arrangement of the areas 4, 5 and 6 from the several application programs 1, 2 and 3 as shown. The CRT face 7 will contain the operator window frame 8 and the various areas 4, 5 and 6 arranged in a subset. This subset will later be seen to be a "vertical subset".

Figure 3A:
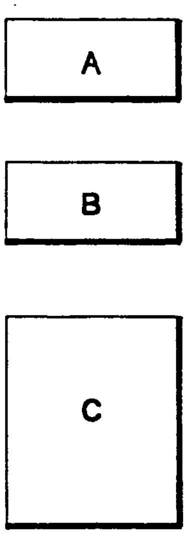
FIG. 3 comprises FIGS. 3A, 3B and 3C and illustrates the concepts of primitive regions, simple subset regions and complex subset regions, respectively.
Figure 3B:
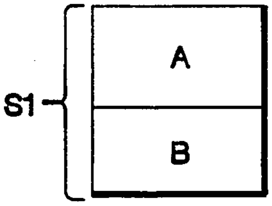
Figure 3C:
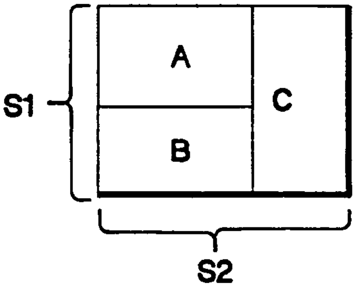

In FIG. 2, it will be seen that a screen display or "window" will be made up of non-overlapping regions or areas that may always be described in terms of rectangles or collections of rectangles. In this application, a single rectangle is referred to as a "primitive" area, and a rectangular collection of such rectangles is referred to as a "subset" area. A subset contains one or more regions and the regions themselves can be either primitive regions or further subsets. FIG. 3A shows three primitive regions A, B and C, while FIG. 3B illustrates a subset region, S1, containing two regions A and B, both of which are themselves primitive regions. FIG. 3C illustrates a complex subset, S2, having two general regions, one of which is the simple subset S1 having regions A and B and the other of which is a primitive region C; region S1 and region C are grouped together horizontally in FIG. 3C.

The foregoing raises the notion of the primary direction of orientation of a subset. Within the realm of display screen technology, the common directions of orientation are vertical and horizontal. There are, accordingly, vertical and horizontal subsets of regions. A vertical subset is one in which the regions or areas for display within the window are arranged vertically from top to bottom in the window. A horizontal subset contains regions that are arranged horizontally from left to right. In FIG. 3B, subset S1 is a vertical subset because regions A and B are arranged one over the other. This might be easily found from analysis by discovering that a divider, i.e. the line between regions A and B extends from border to border within the window in a horizontal direction. That is, a horizontal divider conotes a vertical subset and a vertical divider, as a corollary to this notion, conotes a horizontal subset. The subset S2 in FIG. 3C is a horizontal subset composed of the regions subset S1 and primitive region C.

Figure 4:
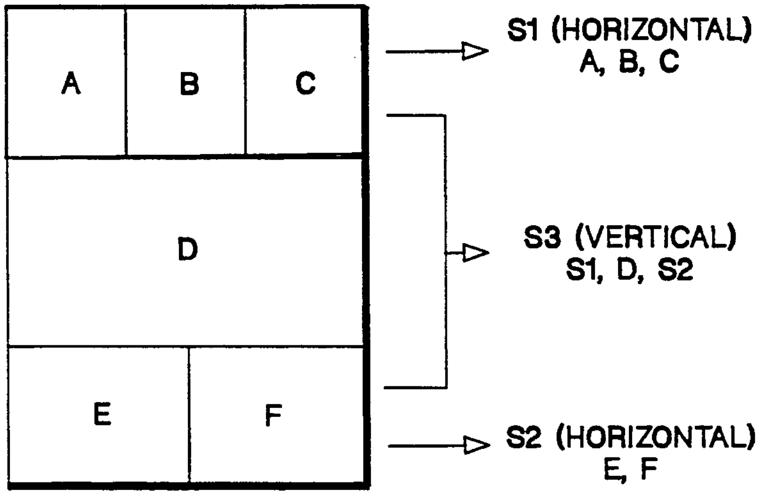
FIG. 4 illustrates the concepts of complex subset regions for display within a window and introduces the concepts of vertical and horizontal orientations for the subsets.

A more complex window display is illustrated in FIG. 4.

In FIG. 4, the overall window display (the outer box or frame within which all of the rectangles are contained) contains three subsets and six primitive regions. The primitive regions are lettered A through F and the subsets are as follows. Subset S1, a horizontal subset, consists of regions A through C. Subset S2, another horizontal subset, consists of regions E and F. Subset S3, a vertical subset, comprises subsets S1, primitive region D and subset S2.

In FIG. 4 the major or definitive subset is that subset which describes the entire screen or window display. In FIG. 4 subset S3 contains the definition of all of the regions and subsets that make up this hypothetical display window. As the operator selects a different size for the outermost rectangle or frame within which all of the primitive regions are contained, the size of the major subset S3 would vary as a function of the window size. It would be necessary to either specify precisely what the redistribution of space should be amongst the members A through F or to provide some automatic technique for recalculating the sizes to be displayed. This is done in the present invention.

The person who originally specifies the appearance of the screen display within a given window (called a panel) would describe an example (panel) as shown in FIG. 4 using panel and region tag statements as shown in Table 1 and Table 2 below. The panel definition prescribed by such a programmer is begun utilizing a panel tag and is closed utilizing a matching end panel tag. The panel tag has command identifiers that establish the panel name, the identity of the help text that will pertain to the panel display as a whole, the overall panel, i.e. window dimensions, the number of message lines to appear on the panel, cursor placement control indicators and a panel title as well as the usual tags for defining areas, instructions at the bottom, dividers, data columns, data fields, information, etc.

TABLE 1

```
Panel Tag ______________________________
<PANEL - start of Panel Definition
      NAME = panel-name
      [ HELP = help-panel-name ]
      [ DEPTH = initial-depth-value ]
      [ WIDTH = initial-width-value ]
      [ MSGLINES = 0 | nbr-msg-lines ]
      [ KEYLIST = key-list-name ]
      [ CSRAREA = area-identifier ]
      [ CSRFIELD = field-identifier ]
      [ CSRINDEX = index-value ]
      [ CSRPOS = position-value ]>
[ panel-title-text ]
.
.- AB         tag
.- AREA       tags
.- BOTINST    tags
.- DIVIDER    tags
.- DTACOL     tags
.- DTAFLD     tags
.- INFO       tags
.- LSTFLD     tags
.- REGION     tags
.- SELFLD     tags
.- TOPINST    tags
.- UC         tags
.
</PANEL> - End of Panel Definition
```

In Table 1 above, "<PANEL" indicates the beginning of the panel definition. The end of the panel definition is indicated by the matching end tag "</PANEL>" as shown in Table 1. The name is the panel name and is a required field. It contains the name of this panel of display information. The name used as the panel identifier can be displayed as an end user option.

The help portion is optional and is the name of the help text panel that is defined with the help tag. It identifies help text that pertains to the panel as a whole and is stored in the commonly accessible area accessible by the application program. It is displayed when the operator requests help and the cursor is not otherwise on a panel element that has its own help text specified for it. Depth and width are attributes specifying the initial depth and width of the window being defined. Once a window is established, the end user can resize it. The "message" line tags an attribute that specifies the number of message lines that are to be reserved on this panel display. "Key list" is an attibute which specifies the name of a key list for the operator's keys that are associated with this particular panel of display information. The "cursor area attribute", together with "cursor field", "cursor index" and "cursor position", are used to control the placement of the cursor on the display whenever this specified panel of information is displayed. These attributes specify the identifier for the area tag that identifies where the cursor should initially be located whenever the panel is displayed. The panel title text is optional and specifies the title that will appear on the panel when it is displayed.

In this preferred embodiment, the programmer is also required to specify the regions that will appear within the window utilizing the tag language as shown in Table 2. The purpose of the region tags is to specify space within the panel definition within which output from other tags is to reside, i.e. the subareas within which data is displayed within a given window. The parameters in the region tag are used to specify information about each region and the way the space within the region is to be allocated. The region tag begins the region and is used to separate parts of a screen or panel definition from other regions. It is also used to control the panel layout in the methods which will be described later. A region may be started at any point within a panel definition and may also start within an earlier defined region, i.e. it may be nested within a previous region.

Table 2 shows an example of region tag.

TABLE 2

```
Region Tag
<REGION
      [ NAME = region-name ]
      [ MIN = row,column ]
      [ MAX = row,column ]
      [ DIR = VERT | HORZ ]
      [ LOC = TOP | BOT, LEFT | RIGHT, CENTER ]
      [ PRIORITY = priority ]>
.
.- (All tags allowed within panels)
.
</REGION>
```

As shown in Table 2 above, the region tag, "<REGION", indicates the beginning of a region definition. A matching end tag, "</REGION>", ends the definition for a region. Within the region tag, NAME gives the region name used when the application programmer wishes to position a message or cursor within a given region that is being specified. MAX is the maximum number of rows or columns to be allocated to a given region, and MIN is the minimum number of rows and columns required for the region. The minimum and maximum parameters are really only valid on primitive regions, i.e. those that do not contain any other regions. The "Direction" parameter tells the compiler operating the process (that will be described later) which direction is the "primary" direction of orientation for the overall window as it is subdivided into other regions. The default value is "vertical", it will cause a vertical list of panel regions to be compiled. The "location" parameter specifies how the region will be placed in a subset relative to other regions in the same subset within a window. "Top" and "bottom" are valid for vertical subsets and "left" and "right" are valid for horizontal subsets. A "center" definition is also possible and is valid for both horizontal or vertical subsets. The default values are: "top" and "left". Finally, the "priority" parameter is utilized to specify which region, when two or more regions within a window have an indeterminate dimension along the primary axis, is to be allocated space preferentially. The priority of allocation is controlled by the priority parameter. All regions having equal priority receive space in equal amounts. Regions of differing priority receive space according to their relative priorities, with the higher number priority receiving extra space sooner than those with lower number priorities. The default priority value is 0, and the maximum is, arbitrarily, 10.

Table 3 illustrates a completed panel definition, i.e. a "window definition" for constructing the display as shown in FIG. 4.

TABLE 3

| | |
|---|---|
| <panel name=example>Example Panel | |
| <region> | /*This first region tag defines the start of (major subset) region S3 |
| <region dir=horz> | /*This second region tag defines start of S1 |
| <region min=10,5> | /*This third region tag defines start of region A |
| </region> | /*This ends region A |
| <region min=5,8> | /*This fourth region tag defines start of region B |
| </region> | /*This ends region B |
| <region min=12,6> | /*This fifth region tag defines start of region C |
| </region> | /*This ends region C |
| </region> | /*This ends subset S1 |
| <region min=9,25> | /*This sixth region tag defines start of region D |
| </region> | /*This ends region D |
| <region dir=horz> | /*This seventh region tag defines start of region (subset) S2 |
| <region min=5,25> | /*This eighth region tag defines start of region E |
| </region> | /*This ends region E |
| <region min=7/30> | /*This ninth region tag defines start of region F |
| </region> | /*This ends region F |
| </region> | /*This ends subset S2 |
| </region> | /*This ends (major) subset region S3 |

Table 3 is self explanatory and shows the completed specification parameter definition for constructing a display within a window as shown in FIG. 4. If a program B, for example, were describing this overall screen display to a program A which would display the specified regions within a window that it had available, then these would be the specified parameters. The definitions in Table 3, together with the processes that will be described later, are all that is necessary to reconstruct the display in FIG. 4 in a window of any given size. It will be noted that in Table 3, the sizes for the primitive regions are not indicated. These must be determined by the controlling program A utilizing the methods as described later when the size of the selected operator window frame is known. Instead, program B only indicates the arrangement, minimum sizes and relative priorities of the primitive regions within the composite window. Program A will create the overall window display such as shown in FIG. 4 based on the size of the selected operator window and on any information provided by program B with the tags as shown in Table 3.

Figure 5A:
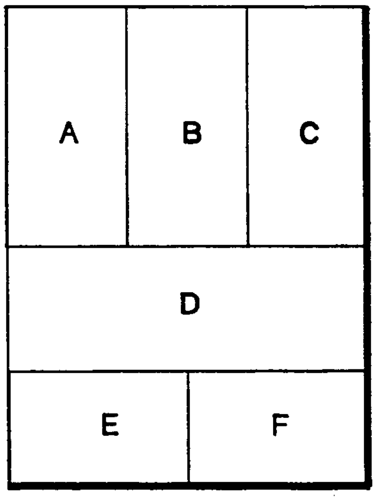
FIG. 5 consisting of FIGS. 5A and 5B illustrates the difference in appearance that can occur in two complex subset window displays having the same number of and arrangement of regions within them, but having regions of differing priorities specified which have been processed by the method of the preferred embodiment.
Figure 5B:
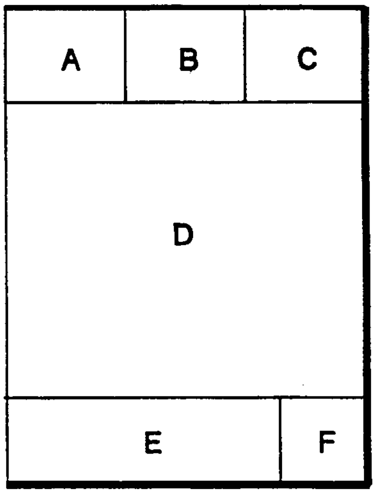

A striking example of the difference that specification of minimum sizes and priorities can make is seen in FIGS. 5A and 5B in which the window display of FIG. 4 is recreated with two different appearances that result when differing priorities and minimum sizes are specified. The concepts of horizontal and vertical subsets along with the information about relative location of areas, their priorities and minimum sizes are all that are necessary, together with the method which will be described below, to reconstruct or, as it is used herein, position and allocate the regions to be displayed within a window of any variable size selected by an operator.

In Table 3 above, the order in which the regions are defined determines their arrangement within subsets. For example, when defining subset S1 with the primary direction "horizontal" as shown in Table 3, if region A is defined first with regions B and C defined second and third, this will indicate that the regions should be arranged with A to the left of B, B in the center and C to the right of B. In priority order, each member will be given its minimum amount of specified space, if possible. After that, space will be allocated to each region based on its relative priority compared to the others within the window. The "minimum" space could be a conditional minimum in which there would be no error condition if there were not enough space to fill all of the minimum requirements. In such an event, regions with the lowest priority would simply be truncated, or might disappear altogether, if the minimum space required is not available in the newly specified window frame size.

Figure 6:
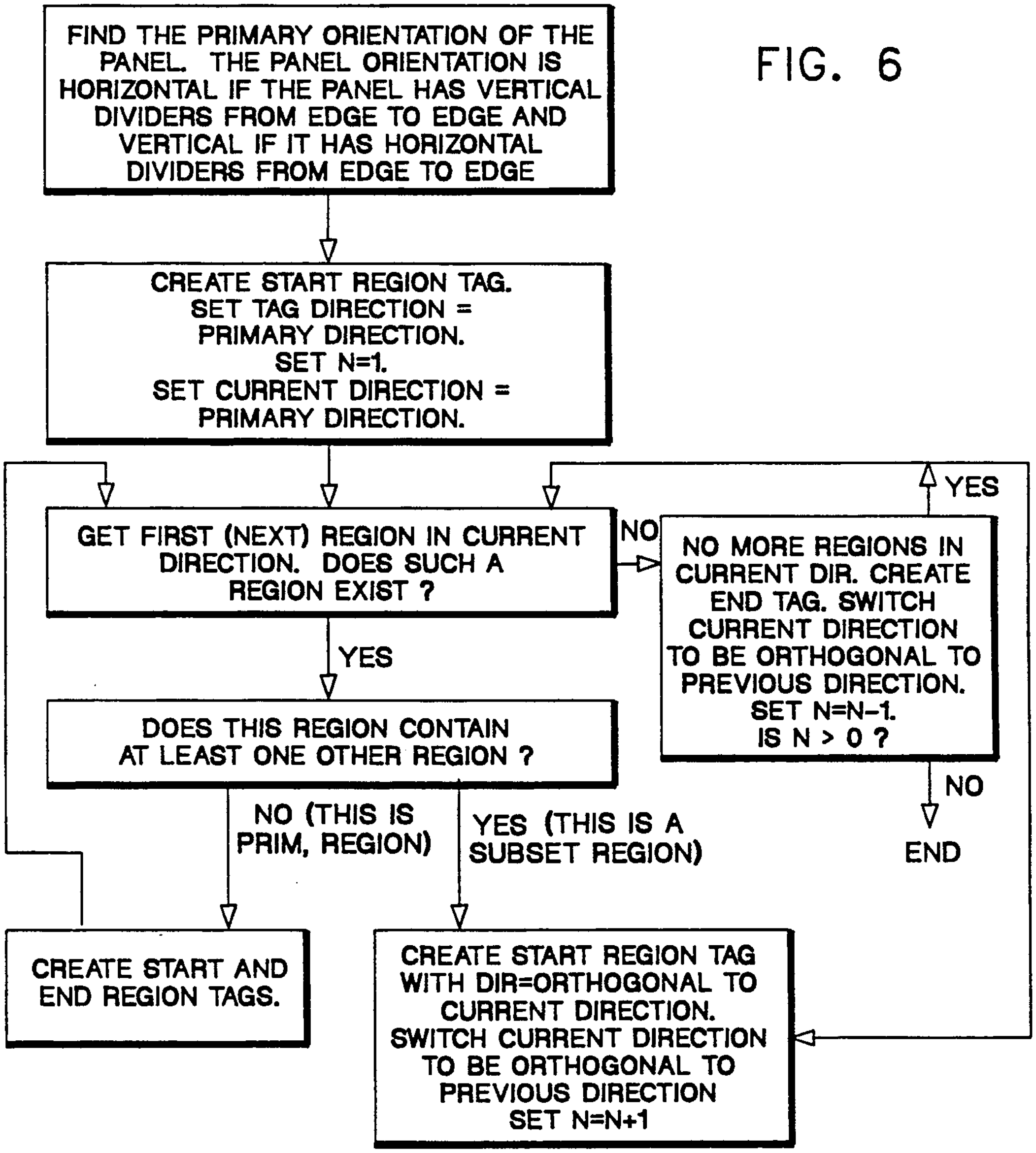
FIG. 6 is the analytical flowchart for the process of analyzing a region or group of regions specified for display within a window for generating a specification for the complete composite regional display.

It may be apparent that an analysis of any specified window of regions can be carried out to find rectangular regions of application data that are to be treated uniquely when resolving the overall window definition to a new window size. The process is illustrated in FIG. 6 in a flowchart. The process begins with the largest region possible that defines the entire window array and then examines the array for the next largest orthogonal set of regions contained within it, if any. The next largest set of regions are then distinguished by having either a horizontal or vertical divider that extends from window boundary to window boundary. The process of finding orthogonal sets of regions within regions continues until there are no more sets of regions. Utilizing the process shown in the flowchart in FIG. 6, any specified window display consisting of one or more regions can be analyzed to generate the definition list for the entire window display as shown in Table 3.

Once a window display has been described utilizing the panel and region tags as noted above, a receiving program can create a panel to fit any size specified operator window. The window display is rebuilt or "resolved" each time the operator window size is changed. The size of each contained region or area will be based upon the minimum specified size thereof and its relative priority as indicated in the tags. The following algorithms are used for recreating, creating, i.e. "resolving", the new window displays in response to the input of the tag specifications and the minimum window size selected by an operator.

Figure 7:
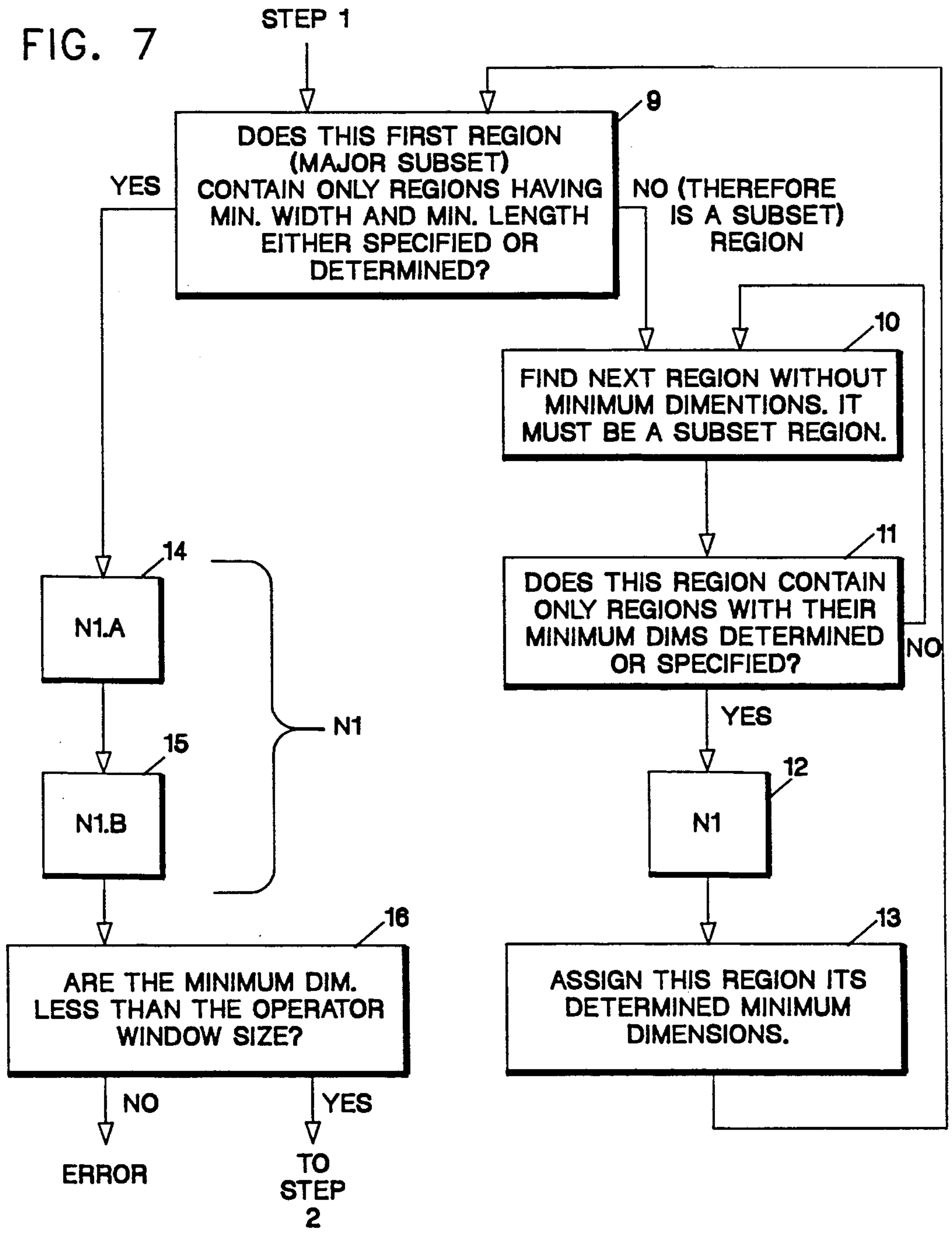
FIG. 7 illustrates the flowchart for the process of calculating the minimum length and width of the composite or subset of regions to be displayed within a window.

The first step as shown in FIG. 7 is to determine whether the chosen operator window size is large enough to accomodate the full array of specified regions. The process is as follows:

N1. For the major subset, determine the minimum subset dimensions as follows in order to determine if the panel will fit within the given operator window*:

N1.*a*. Determine the minimum subset orthogonal dimension by finding the largest of the minimum orthogonal dimensions of all of the regions.

N1.*b*. Determine a minimum subset primary dimension by adding together the minimum primary dimensions of all of the regions in the subset.

If a subset contains regions that are themselves subsets, the minimum dimensions of each such region must be determined first. If the regions are primitive regions, the minimum dimensions of these regions will be defined in the tags such as in Table 3. The flowchart in FIG. 7 shows the method of determining the minimum dimensions to determine whether the panel, i.e. window array specified, will fit within a given operator window size that has been selected by the operator. In the flowchart of FIG. 7, "N1.*a*" and "N1.*b*" and "N1" refer to the steps in the algorithm above.

The flowchart in FIG. 7 begins in box 9 and eventually ends in box 16 with a determination that the minimum dimensions either are, or are not, less than the specified operator window size. If the minimum dimensions of the specified window display are larger than the specified available window size selected by the operator, an error condition can be indicated or, if desired, the default condition can be to display, i.e. "resolve" the overall subset with the lowest priority members truncated entirely. However, assuming that the minimum dimensions of the specified operator window size are larger than or equal to the minimum size necessary for the total array as found from the process in FIG. 7, step 2 of the process of resolving each subset to create the new display is begun.

Step 2 begins with finding the major subset, i.e. the one which defines the overall array of regions making up a window, and then resolves each subset and resolves each region that is itself a subset. In this context, to "resolve a subset" means to determine the final dimensions of the subset of regions, the final dimensions of each region within the subset, and the arrangement of the regions and any "white space" left over within the selected window size. In resolving a subset, the maximum potential window dimensions are utilized and any difference between the maximum available window dimensions and the final dimensions becomes the "white space" in the final window display which is allocated in accordance with the priority and location parameters. The maximum potential dimensions of the major subset defining any given window display are the available length and width of the operator-specified operator window frame size.

Figure 8:
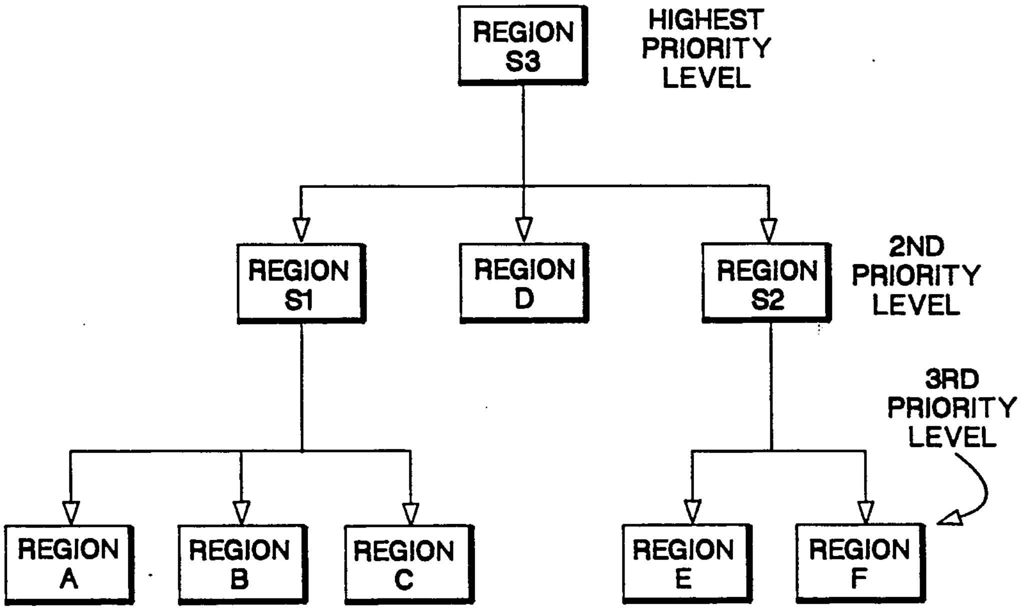
FIG. 8 illustrates schematically the concept of regional priorities of regions for display within a window.
Figure 9:
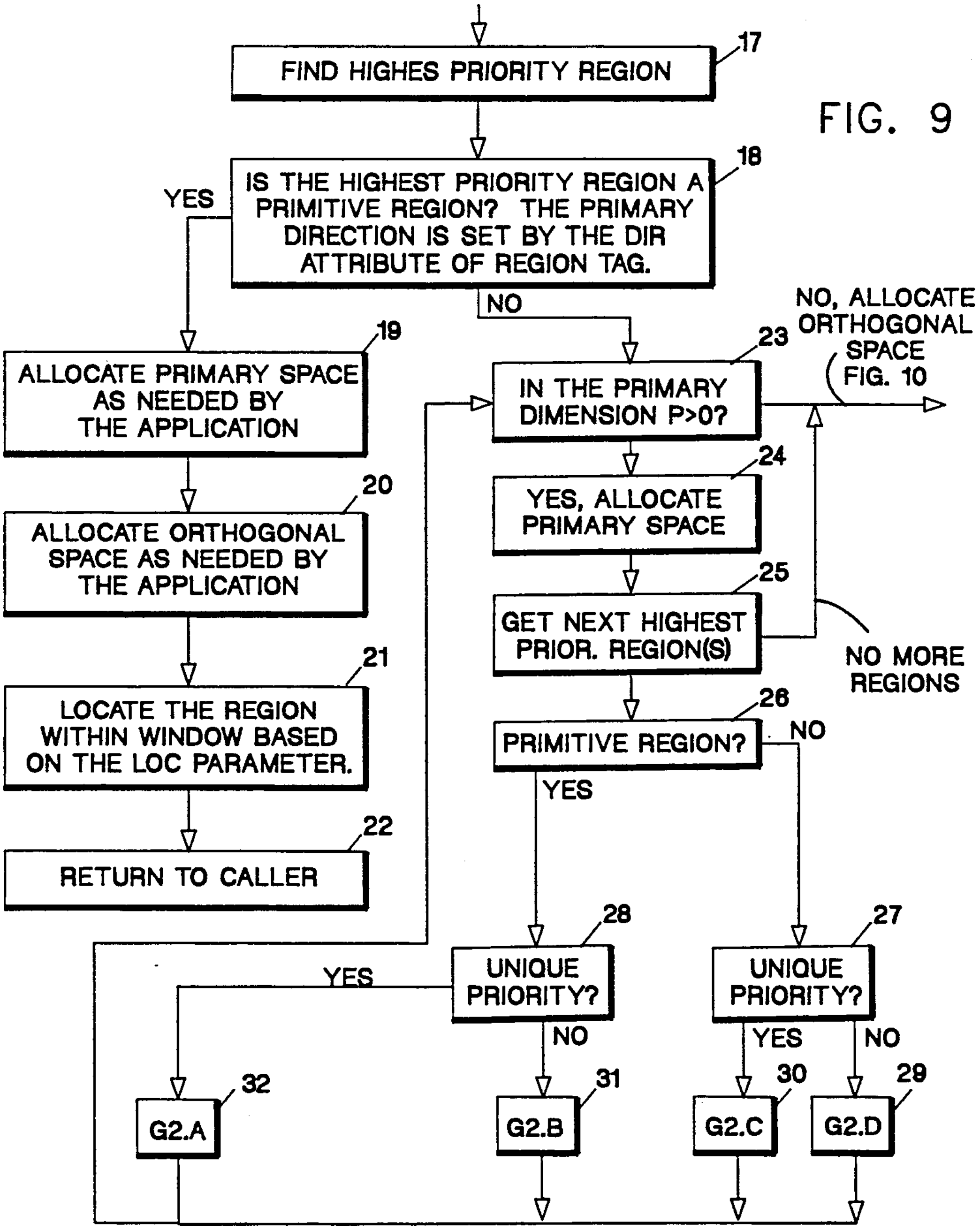
FIG. 9 illustrates the process flows for allocating space within the window in the primary direction of orientation of the subset of regions to be displayed.
Figure 10:
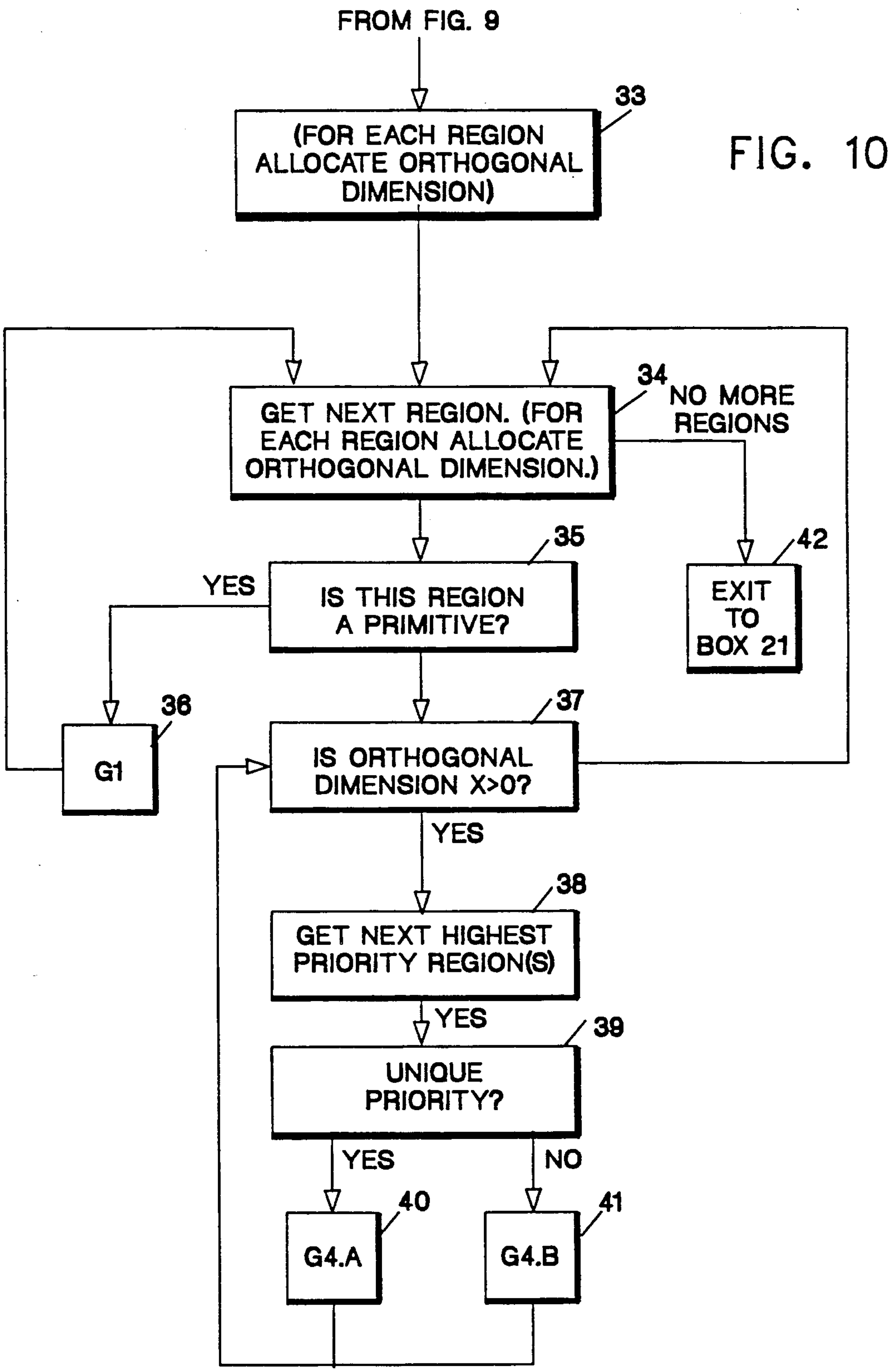
FIG. 10 illustrates the process flowchart portion which relates to the allocation of display space in the direction orthogonal to the primary direction of orientation of the regions for display within the window.

FIG. 8 illustrates the hiearchical ordering of regions within a given window display such as that illustrated initially in FIG. 4. The highest priority level for resolution is the subset S3 that contains in it the definition of the entire window array. FIG. 8 illustrates this concept in which the highest priority level contains only region S3. The next echelon contains regions S1, primitive region D and region S2. These are all of equal priority level and are resolved second. Finally, regions A, B, C, E and F are at the third priority level and are resolved last. The hierarchical priority levels are utilized for assigning space, since priorities specified for a given region are only compared with other regions at their same level in the hierarchy, i.e. a priority 10 region F would not be compared with a priority 10 region S3, but only with any equal-level priorities specified for members A, B, C or E in FIG. 8. This will be understood in greater detail when the flowchart for the resolution pricess in FIGS. 9 and 10 is discussed.

For the step of resolving the areas in a subset the process is as follows:

G1. For each region R that is a primitive region, set the final orthogonal region of R to be the smaller of:

1. the potential orthogonal dimension of the subset in which the region lies or 2. the orthogonal dimension of the application space associated with R.

Step G2.

Divide the potential primary dimension, i.e. the maximum window dimension of the subset between the regions within the subset as follows: allocate the primary dimension P to each region in the order of priority of the regions and in an amount to their minimum specified primary dimension; next allocate the orthogonal dimension X to each region in the subset in the order of priority among the regions making up the subset according to their specified primary orthogonal dimensions.

Let capital P represent the primary axis dimension to be allocated in the display. Initially P will be the maximum window dimension in the primary direction.

If capital P is still greater than 0 after all regions have had their specified minimum primary dimensions allocated to them, this means that there is still some primary dimension within the window to be allocated. This space is then allocated by allocating additional primary allocations to each region within the subset and decreasing capital P by that amount allocated. Allocation is begun with the highest priority region within the subset until its maximum allocation as specified has been achieved or P is exhausted and then moving on to the next highest priority region, if any, until all regions have been processed or the remainder P becomes 0.

The rules for allocating primary dimensions within the window to a region within the subset are as follows:

Step G2.*a*

If the region is a primitive region then, if no other regions have the same or higher priority, in addition to what has already been allocated as the minimum, allocate to that region either all of the remaining P or that portion of P which makes the total amount allocated equal to the primary dimension of the associated application space. Subtract the amount allocated from the remainder P and set the final primary dimension of the region to whatever has been allocated. Application space is that space needed by the data within the region and may be identified from its application program.

If there are other regions within the subset that have the same priority, then divide P by the number of regions having equal priority and call the result P′. In addition to what has been allocated for the minimum dimensions for each such member, allocate to each of the regions either all of P′ or that portion thereof which makes the total amount allocated equal to the primary dimensions associated with these regions in their application of space. The final primary dimension of each region will be set to be equal to the total amount allocated. If the region was not given all of P′, then P′ is recomputed for any other regions that have equal priority and processed in the same way until all of P′ has been exhausted.

If the region is a subset itself, it is axiomatic that the axis of orientation or organization of the subset must be orthogonal to the primary specified direction.

Step G2.*c*

If no other subsets in this orthogonal direction have equal priority, for each region in this subset in addition to what may have already been allocated for the minimum primary dimensions, allocate to that region the smaller of either the remaining primary dimension P or the primary dimension of the application space associated with that region. Set the final primary dimension of this subset to be equal to the primary dimension of the largest region within the subset. Subtract from P the amount finally allocated for this final primary dimension.

Step G2.*d*

If there are other subsets with the same priority in this orthogonal direction, divide P by the number of subsets having equal priority calling the result P′. For each of these subsets add to the minimum primary dimension of each region in the subset the smaller of either the primary dimension of P′ or the primary dimension of the application space associated with that region. Set the final primary dimension of this subset to be equal to the primary dimension of the largest region, that is, the dimension in the primary direction for the subset. Subtract from P′ any additional amount allocated for this final primary dimension. If the subset has not been allocated all of P′, recompute P′ for the remaining subsets having any equal priority and if there are none to those having next lowest priority, etc. Process each region with equal priority in the same way. If the last subset has not been given all of P′, the amount left over will be assigned back to primary space P to be allocated as follows.

Step G3

If there is any difference between the potential maximum, i.e. the specified window dimension, and the final dimension that is allocated in the subset, arrange the regions and any remaining space in the direction P, i.e. the white space, based upon the location parameter for the regions making up the subset.

Step G4

Finally, it is necessary to divide the potential orthogonal maximum dimensions of the subset between the regions as follows: Let X represent the orthogonal dimension still to be allocated to the regions within the subset after all have been given their minimum orthogonal dimensions. If X is still greater than 0, then allocate the orthogonal dimension to each region and decrease X by the amount allocated beginning with the highest priority region and moving on to the next lower priority until all regions have been processed or the remainder of X is 0. In order to allocate orthogonal dimension to a region which is a primitive region:

Step G4.*a*

If no other regions have the same priority, then in addition to what has already been allocated for the minimum orthogonal dimension, allocate for that region either all of the remaining X or that portion of X which makes the total amount allocated equal to the orthogonal dimension of the associated application space, subtracting the amount allocated from X. Set the final orthogonal dimension of this region to be the total amount allocated.

Step G4.*b*

If there are other regions with the same priority, divide X by the number of such regions and call the result X′. In addition to what has already been allocated for the minimum orthogonal dimension, allocate to the region either all of X′ or that portion thereof which makes the total amount allocated equal to the orthogonal dimension of the associated application space. Set the final orthogonal dimension of the region to the total amount allocated. If this region has not exhausted all of X′, then recompute X′ for any remaining regions having equal priority and process each region with equal priority in the same way.

FIG. 9 illustrates the process of this step 2 of allocation in a detailed flowchart. Beginning in box 17, the first step is to find the highest priority region, i.e. in this context this means to find the region such as in FIG. 8 which hierarchically has the highest order, i.e. the one which is the major subset specifying the entire contents of the desired window display. The process continues in box 18 where the highest priority region is checked to determine whether it is a primitive region. The primary direction is found from the direction attribute in the region tags and it is the primary direction space which is allocated first. Assuming that the highest priority region in box 17 is found in box 18 to be a primary region, the flow goes to boxes 19 and 20 where the primary space, i.e. the space in the primary axis of orientation, is allocated as needed and then the orthogonal space, i.e. the dimension at 90 degrees to the specified primary direction of orientation is allocated. Next, the regions are located within the window based on their location parameters which automatically results in placing the white space relative to the specified location for the regions, and the process is exited in box 22. However, assuming that the highest priority region found in box 18 is not a primitive region, the process continues to box 23 through 32 until finally there are no more regions to be allocated any space in the primary dimension. FIG. 9 is then exited from box 23 to the process of allocating the orthogonal space as shown in more detail in FIG. 10.

In FIG. 10, the process is begun in box 33 for computing the allocation of the orthogonal dimension for each region. It continues to box 34 where the next region to be processed is fetched, to box 35 where the region is examined for being primitive or not and continues through box 40 or 41 until all of the space has been assigned and the regions are exhausted in which case the system shown in this process exits through box 42 back to box 21 in FIG. 9 to locate the regions within the window based upon their location parameters.

In each of these flowcharts 9 and 10, the references within the boxes to steps "G2*a*", "G2*b*", etc refer to the overall description of the algorithm given above.

Having therefore described our invention with reference to a preferred embodiment thereof, it will be apparent to those of skill in the art that numerous departures from the specific algorithms given may be made without departing from the generic process for analyzing the specified window display and recreating similar displays within windows of various sizes after recomputing the allocation of space in the primary and orthogonal directions.

Therefore, what is contained in the following claims is intended by way of example only and not of limitation in which what is claimed is:

1. A computer-implemented method of controlling construction of visual window displays from area specifications describing relative area positions, priorities and minimum sizes comprising the steps of:

determining whether specified minimum dimensions of a composite of specified areas to be displayed within a window are equal to or less than available space within the window; and if sufficient space is available within the window, allocating final dimensions and arrangement from the available space by first allocating dimensions in a primary axis of orientation and then allocating the dimensions in an axis orthogonal to said primary axis.

2. Method as described in claim 1 further comprising steps of:

said allocating of available window areas among said specified regions is determined by the specified minimum size, priority and position.

3. A method as described in claim 2 further comprising:

allocating the available space of said window among regions to be displayed therein by assigning window space in the primary axis of orientation of the composite regions to be displayed to said regions in the order of their priorities as indicated by said priority specifications.

4. A method as described in claim 3 further comprising:

arranging said regions within said window space in accordance with the relative area position specifications.

5. A computer-implemented method of generating a display of regions within a viewing window comprising steps of:

encoding region control indicators for controlling the generation of region displays, said indicators comprising a primary axis of orientation indicator, a relative regional location indicator, a priority indicator and a minimum dimension indicator; and allocating space within a specified viewing window among said specified regions by utilizing said indicators in comparison with corresponding characteristics of the viewing window.

6. A method as described in claim 5, further comprising:

allocating the space within the viewing window by assigning first a dimension available in a primary axis of orientation indicated by said primary direction indicator to said regions in the order of the specified region priorities as indicated by said region priority indicators.

7. A method as described in claim 6, further comprising:

arranging said regions within said space in accordance with said relative location indicators of said regions.

8. A method as described in claim 7, further comprising:

allocating space in a direction orthogonal to said primary axis of orientation; and arranging said regions within said window space in accordance with said relative location indicators.

* * * * *